Figure 1:
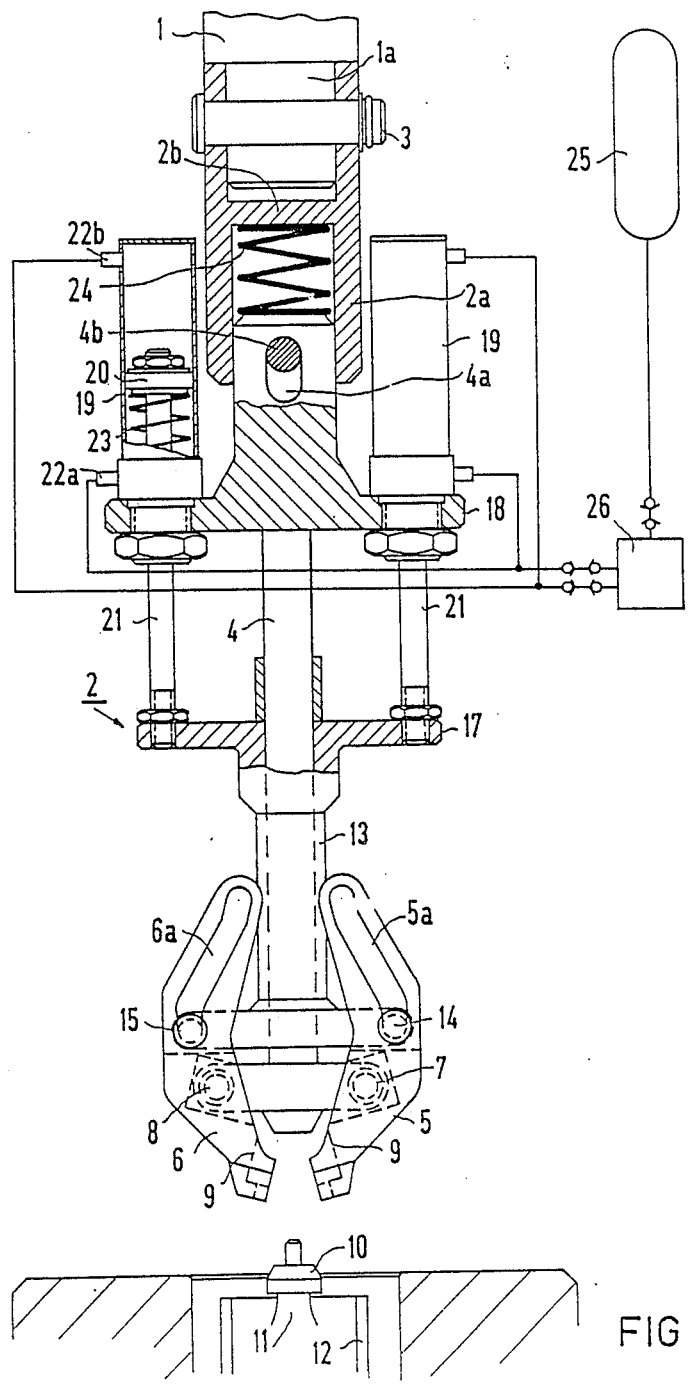

United States Patent [19]

Forster et al.

[11] Patent Number: 4,886,635
[45] Date of Patent: Dec. 12, 1989

[54] GRIPPING TOOL FOR A DEVICE FOR THE REMOTE-CONTROLLED REMOVAL OF SAMPLES FROM A CONTAINER, IN PARTICULAR FROM A PRESSURE VESSEL OF A REACTOR

[75] Inventors: Josef Forster, Hirschaid; Johann Selinger, Oberasbach, both of Fed. Rep. of Germany

[73] Assignee: Siemens Aktiengesellschaft, Munich, Fed. Rep. of Germany

[21] Appl. No.: 216,137

[22] Filed: Jul. 7, 1988

[30] Foreign Application Priority Data

Jul. 9, 1987 [DE] Fed. Rep. of Germany ... 8709485[U]

[51] Int. Cl.⁴ ............................................. G21C 19/20
[52] U.S. Cl. .................................... 376/268; 294/116; 294/906
[58] Field of Search ............... 376/261, 271, 268, 262; 294/906, 86.29, 86.3, 86.33, 116

[56] References Cited

U.S. PATENT DOCUMENTS

| | | | |
|---|---|---|---|
| 2,215,844 | 9/1940 | Van Syckle | 294/116 |
| 3,198,570 | 8/1965 | Sines | 294/116 |
| 4,460,536 | 7/1984 | Krieger | 376/268 |
| 4,482,520 | 11/1984 | Randazza | 376/261 |

FOREIGN PATENT DOCUMENTS

| | | |
|---|---|---|
| 620044 | 7/1962 | Belgium . |
| 2053645 | 5/1972 | Fed. Rep. of Germany . |
| 1450728 | 7/1965 | France . |
| 2473775 | 7/1981 | France . |

*Primary Examiner*—Daniel Wasil
*Attorney, Agent, or Firm*—Herbert L. Lerner; Laurence A. Greenberg

[57] ABSTRACT

A gripping tool for a device for the remote-controlled removal of samples in housings with heads from a container includes a mast having a first coupling part. A second coupling part is opposite and associated with the first coupling part. A guide bar elastically bears on the second coupling part in a telescoping manner with pivots disposed on the guide bar. At least two catches of a two-armed lever are disposed on the pivots and have guide grooves formed therein. A bushing surrounding the guide bar has guide pins each engaging a respective one of the guide grooves. At least one remotely controlled linear drive moves the bushing in the direction of the longitudinal axis of the bushing for surrounding the head of the sample housing with the catches like tongs.

2 Claims, 2 Drawing Sheets

GRIPPING TOOL FOR A DEVICE FOR THE REMOTE-CONTROLLED REMOVAL OF SAMPLES FROM A CONTAINER, IN PARTICULAR FROM A PRESSURE VESSEL OF A REACTOR

The invention relates to a gripping tool for a device for the remote-controlled removal of samples or specimens from a container, especially a pressure vessel of a reactor, including a guide bar disposed on a mast, and at least two catches in the form of a two-armed-lever disposed on the mast in pivots for surrounding a head of the sample housing like a clamp when activated.

A conduit is provided on the outside wall of the core vessel of a reactor pressure vessel in which a radiation sample column disposed in a capsule is inserted after the first fuel assembly cycle. Following the second fuel assembly cycle, the capsule containing the sample is removed from the reactor pressure vessel and is suspended under water at the edge of the fuel assembly reservoir. Removal of the sample takes place from the fuel assembly reservoir. Then a fresh radiation sample is inserted into the reactor pressure vessel.

It is known to use a gripping tool for the removal of samples having a guide bar disposed on a mast, in which catches are each fixed on a pivot point in such way that they grasp a head of the housing like a clamp when activated. The gripping tool is suspended from a crane and lowered towards the reactor pressure vessel until it is seated on the head of the sample retainer, where the catches engage the sample head and grasp it like a clamp. It is possible for buckling or damage to the radiation sample to occur during the course of setting down the gripping tool, which must be done by remote control from a considerable height.

It is accordingly an object of the invention to provide a gripping tool for a device for the remote-controlled removal of samples from a container, in particular from a pressure vessel of a reactor, which overcomes the hereinafore-mentioned disadvantages of the heretofore-known devices of this general type and which avoids a deformation of the housing and thus damage to the sample.

With the foregoing and other objects in view there is provided, in accordance with the invention, a gripping tool for a device for the remote-controlled removal of samples in housings with heads from a container, in particular a pressure vessel of a reactor, comprising a mast having a first coupling part or connecting element, a second coupling part or connecting element opposite and associated with the first coupling part, a guide bar elastically bearing or being disposed on the second coupling part in a telescoping manner, pivots disposed on the guide bar, at least two catches of a two-armed lever being disposed on the pivots and having guide grooves formed therein, a bushing or sleeve surrounding the guide bar having guide pins each engaging a respective one of the guide grooves, and at least one remotely controlled linear drive moving the bushing in the direction of the longitudinal axis of the bushing for surrounding the head of the sample housing with the catches like tongs or a clamp.

In this way the gripping tool can be placed on the head of the housing for the sample with the catches open. The forces acting on the head of the housing for the sample during placement are kept small due to the elastic mounting of the guide bar on the mast and damage to the radiation column is prevented.

In accordance with another feature of the invention, the at least one remotely controlled linear drive is a pressure medium drive including at least one cylinder disposed on the guide bar having a piston with a piston rod connected to the bushing.

In accordance with a further feature of the invention, there are provided control lines connected to the cylinder, and a return spring disposed in the cylinder for maintaining the catches in a closed position in case of pressure reduction in the control lines.

In accordance with a concomitant feature of the invention, the first coupling part is an existing element provided for pulling fuel assemblies, and the second coupling part is adapted to and connected with the first coupling part.

Due to this feature, the mast for pulling fuel assemblies which is provided in a nuclear power plant in any event, can be used for the gripping tool so that a separate mast for the gripping tool is not necessary. This results in a considerable simplification as compared to the prior art structure, since only the head need to be exchanged.

Other features which are considered as characteristic for the invention are set forth in the appended claims.

Although the invention is illustrated and described herein as embodied in a gripping tool for a device for the remote-controlled removal of samples from a container, in particular from a pressure vessel of a reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
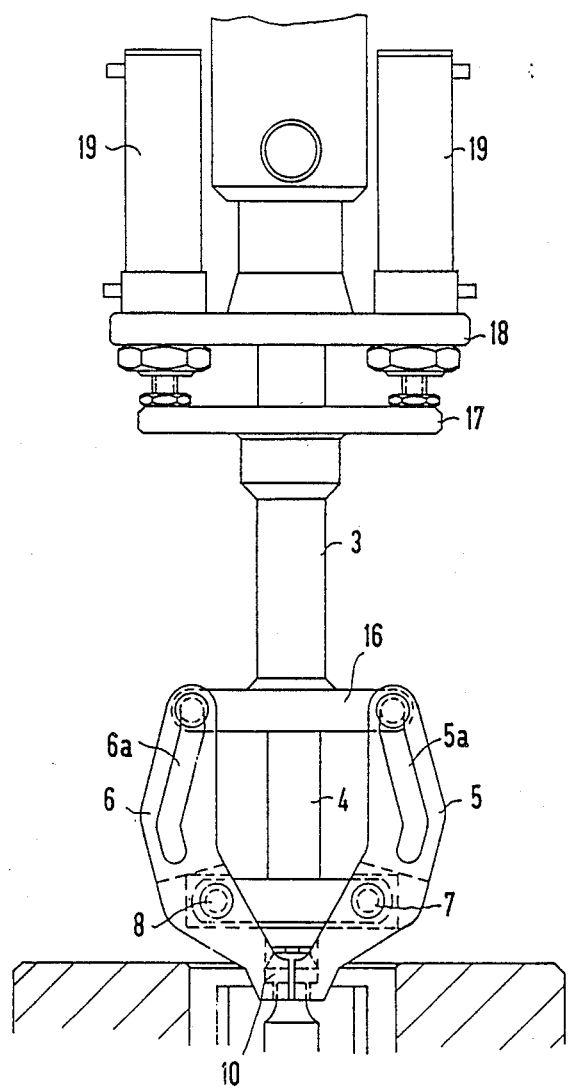

FIG. 1 is a fragmentary, diagrammatic, longitudinal-sectional view of a gripping tool prior to engagement with the head of a housing for a sample: and FIG. 2 is a fragmentary, elevational view illustrating the position of catches of the tool when the head of the housing for a sample is surrounded by the tool like a clamp, tongs or pliers.

Referring now to the figures of the drawings in detail and first, particularly, to FIG. 1 thereof, there is seen a gripping tool 2 that can be connected to the lower end of a mast 1 which can be suspended from a crane. The mast 1 has a first coupling half or part or connecting member 1a in the form of a pin which can be inserted into an opposite coupling half or part or connecting member 2a in the form of a sleeve. The sleeve 2a is retained on the top of the pin 1a by means of a bolt 3. A guide bar 4 is spring-mounted with telescope-like placement or suspension in the bottom of the sleeve 2a. A pressure spring 24 which is disposed in the sleeve 2a has one end braced on a partition 2b and the other end on the front surface of the guide bar 4. The travel of the spring is defined by an oblong hole 4a. A bolt 4b which is fixed in the sleeve 2a extends through the oblong hole 4a.

On the other end of the guide bar 4, catches 5, 6 in the form of a two-armed lever are disposed in respective pivots 7, 8. The catches 5, 6 are used to grasp a head 10 which is disposed on a capsule 12 by means of a retainer 11 and in which a sample or specimen is placed. A bolt 10a protrudes from the head 10. The inner surfaces of the catches 5, 6 have gripping surfaces 9 adapted to the shape of the head 10 so that they grasp the head 10 in a form-locking manner when they are in the closed position. A form-locking connection is one which connects two elements together due to the shape of the elements themselves, as opposed to a force-locking connection, which locks the elements together by force external to the elements.

The guide bar 4 is surrounded by a sleeve bushing or 13 having guide pins 14, 15 which engage respective guide grooves 5a, 6a of the catches 5, 6. The guide pins 14, 15 are fixedly disposed on a lateral support 16 of the sleeve 13 as seen in FIG. 2, and can be moved in the direction of the longitudinal axis of the sleeve by means of a remotely-controllable linear drive acting on a flange 17 of the sleeve. The linear drive is advantageously in the form of a pressure medium drive in which cylinders 19 with pistons 20 are disposed on a flange 18 of the guide bar. The pistons 20 are each connected through a piston rod 21 with the flange 17 of the sleeve 13. The cylinders 20 are supplied with compressed air or a hydraulic medium through control lines 22b for opening the catches 5, 6 and through control lines 22a for closing the catches 5, 6. Return springs 23 which are additionally installed in the cylinders 19 assure that the pistons 20 remain in the upper position and the catches 5, 6 remain closed, in case of a sudden reduction of pressure in the control lines 22a.

In order to remove the sample by remote control, the control lines 22 are linked with a pneumatic system in which the pressure lines connected with the cylinders 19 are connected with a pneumatic reservoir 25 through a shift device 26 disposed in a control panel. An operational check of the gripping tool 2 is then performed while the mast 1 is suspended from the crane. If the piston rods 21 are extended, the catches are open. The gripping tool 2 is lowered in this position by the crane until it rests on the head 10 of the retainer 11 of the capsule 12 for the sample. The protruding bolt 10a completely retracts elastically. An additional strong damping of the shock occurring when the gripping tool 2 is seated and avoidance of damage to the radiation column are achieved due to the fact that the guide bar 4 is yieldingly seated in a telescope-like manner in the sleeve 2a by means of the spring 24. After the gripping tool has been seated, the pistons 20 are retracted by charging the control lines 22a so that the catches 5, 6 close in a form-locking manner around the head 10, as seen in FIG. 2. A form-locking connection is one which connects two elements together due to the shape of the elements themselves, as opposed to a force-locking connection, which locks the elements together by force external to the elements. The radiation sample can then be pulled and suspended in a fuel assembly reservoir. The return springs 23 assure that the catches 5, 6 remain closed if accidental reduction of pressure occurs in the pressure medium lines 22 during transport by the crane.

In order to open the catches, the piston rods 20 are extended by supplying pressure medium to the control lines 22b.

We claim:

1. Gripping tool for a device for the remote-controlled removal of samples in housings with heads from a container, comprising a rigid mast having a first coupling part, a second coupling part opposite and associated with said first coupling part, a guide bar elastically bearing on said second coupling part in a telescoping manner, pivots disposed on said guide bar, at least two catches of a two-armed lever being disposed on said pivots and having a guide grooves formed therein, a bushing surrounding said guide bar having guide pins each engaging a respective one of said guide grooves, and at least one remotely controlled linear pressure medium drive moving said bushing in the direction of the longitudinal axis of said bushing for surrounding the head of the sample housing with said catches like tongs, said at least one drive including at least one cylinder disposed on said guide bar having a piston with a piston rod connected to said bushing.

2. Gripping tool according to claim 1, wherein said first coupling part is an existing element provided for pulling fuel assemblies, and said second coupling part is adapted to and connected with said first coupling part.

* * * * *